Patented Aug. 17, 1937

2,090,437

UNITED STATES PATENT OFFICE 2,090,437

DENTIFRICE

Norman E. Woldman, Cleveland, Ohio

No Drawing. Application August 9, 1934,
Serial No. 739,135

7 Claims. (Cl. 167—93)

This invention relates to dentifrices; and it comprises a new dentifrice containing a pasty fluent mixture of fine ground sodium perborate and an edible oil readily dispersing in the mouth, the dentifrice also usually containing accessory ingredients, such as precipitated chalk, etc., and being free of moisture; all as more fully hereinafter set forth and as claimed.

Sodium perborate is now commercially available and is finding favor as a mouth antiseptic, germicide and bleaching agent, as in laundries. Potassium perborate and ammonium perborate are similar salts. Sodium perborate crystallizes with 4 molecules of water, $NaBO_3.4H_2O$, and as a solid crystallized salt it is a stable material, readily packaged and stored without deterioration. It carries about 10 per cent of available oxygen; this oxygen being readily removed by most organic materials; a fact to which its bleaching efficiency is due. In solution however, and under any circumstances where moisture can gain access, it is quite unstable. An aqueous solution much resembles one of hydrogen peroxide and probably contains that body. Like hydrogen peroxide it is readily decomposed by the catalytic action of dust and all sorts of things, and particularly organic materials. The catalytic action, as with hydrogen peroxide, results in the formation and evolution of oxygen as a gas. With liberation of oxygen a sodium borate is formed differing from ordinary borax in that it contains more soda and less $B_2O_3$; it is somewhat more alkaline and in aqueous solution exercises a stronger emulsifying action on oils. Because of its instability, although an aqueous solution of sodium perborate is recognized as an excellent antiseptic and sterilizing agent particularly adapted for use as a mouth wash, it must be used as such; neither the solution nor the solid salt tolerating compounding with the ordinary materials used for therapeutical purposes. The use of an aqueous solution of sodium perborate is standard practice in treating "trench mouth" but it must be fresh made; made at the time of use. It is not considered practicable to make a packaged stable standard preparation containing sodium perborate and any hydrated or hygroscopic organic material; or any material which might catalyze the development of free oxygen. The use of sodium perborate for therapeutical purposes as freshly prepared aqueous solutions is not convenient.

Standardized preparations are wanted; and the need for a stable dentifrice preparation, utilizing the properties of sodium perborate in a dentifrice of the usual physical properties is particularly urgent. There is a need for a pasty preparation of standardized oxygen content not changing with time.

While, as stated, sodium perborate is incompatible with most of the wet things used in ordinary dentifrices, I have found that it is compatible with, and stable in the presence of, highly purified neutral oils of the glycerid type having the character of those used as salad oils; as edible oils. In admixing with an oil of this type it is indefinitely stable and a standardized pasty mixture can readily be prepared, easily dispensed from collapsible tubes and the like. So far as stabilization and preservation are concerned any good grade neutral fatty oil can be used, not only vegetable oils but lard oil, oleo oil, etc. But in a dentifrice another property is wanted: the oily preserving liquid must be one which will disperse readily in the mouth; which does not leave the teeth and gums greasy. All the oils sold as salad oils have this property in a greater or less degree. High grade, carefully purified olive oil is a typical salad oil; it is not only a preservative or stabilizer for sodium perborate but it disperses readily in the mouth, giving the saliva access to the sodium perborate which then forms a solution with the properties desired. It forms, so to speak hydrogen peroxide in situ. The presence of the sodium perborate, and of the sodium borate formed from it, aids in dispersion; both being good emulsifying agents.

High grade, well purified peanut oil, palm oil, etc., may be used like olive oil. But I find that in practice I obtain the best results with a carefully purified, deodorized cotton seed oil; deodorization being effected either by a light hydrogenation, by alcohol extraction, or by other chemical and physical methods. It has the necessary properties in that it is free of moisture, is non-hygroscopic, is of agreeable taste and odor and readily dispersible in the mouth. Hydrogenation and other purifying treatments free it of readily oxidizable constituents which might act on the perborate.

In making a dentifrice I ordinarily add "precipitated chalk" a form of calcium carbonate, as an abrasive. Any other little reactive fine solid body of medium hardness used in dentifrices may be used in addition to, or in lieu of the precipitated chalk. The quantity of oil used is adjusted to that which will give a good paste with the two solid bodies present: sodium perborate and chalk. The proportion of precipitated chalk may be varied at will; but in all cases there is enough of the oil to make a good paste with the solids present.

In the complete dentifrice I customarily add a little saccharin as a sweetening agent and a little menthol or other flavor-giving ingredient.

A good standardized dentifrice under the present invention can be made by first mixing together and triturating 25 parts by weight sodium perborate fine ground and bolted to about 100 mesh fineness with 35 parts commercial dry precipitated chalk. In this dry powdered mixture about 0.4 part commercial saccharin powder may be incorporated. To the mixture 40 parts of carefully deodorized and neutral dry cotton seed oil is added gradually and trituration is continued until a smooth paste of uniform consistency is obtained. For flavoring purposes 0.8 part of menthol crystals is dissolved in the oil prior to its addition to the perborate mixture. The paste thus produced has the right physical consistency, is indefinitely stable in collapsible tube packages and disperses readily in the mouth.

The dentifrice produced retained its available oxygen content indefinitely. The edible oil used was of pleasant taste and gave no greasy feeling in the mouth. Under the influence of saliva it dispersed readily giving the saliva free access to the sodium perborate and generating available oxygen in situ. The preparation was moisture proof; not taking up moisture from the air.

What I claim is:—

1. In a dentifrice, a stable standardized pasty composition containing fine ground sodium perborate and a highly refined edible oil of glycerid nature, free of moisture and readily dispersible in the mouth.

2. The composition of claim 1 wherein the edible oil is a neutral deodorized cotton seed oil.

3. As a new composition of matter sodium perborate made into a paste, stabilized and protected by admixture with an edible oil of the glycerid type and of the grade known as salad oils, said oil being free of moisture.

4. A composition of matter for the treatment of the teeth and gums, comprising a pasty composition containing sodium perborate and a refined edible oil of glyceride nature.

5. The composition of claim 4 wherein said refined edible oil is purified olive oil.

6. The composition of claim 4 wherein said refined edible oil is purified peanut oil.

7. The composition of claim 4 wherein said composition is a dentifrice comprising 25 parts of fine ground sodium perborate of 100 mesh fineness, 35 parts of commercial dry precipitated chalk, 0.4 part commercial saccharin powder and 40 parts of carefully deodorized and neutral cotton seed oil, said dentifrice being a stable standardized pasty composition.

NORMAN E. WOLDMAN.